(12) United States Patent  (10) Patent No.: US 7,714,271 B1
Levine  (45) Date of Patent: May 11, 2010

(54) SIMPLE FIBER OPTIC SEISMOMETER FOR HARSH ENVIRONMENTS

(75) Inventor: Bart Levine, Boise, ID (US)

(73) Assignee: United States Oil and Gas Corp., Austin, TX (US)

( * ) Notice: Subject to any disclaimer, the term of this patent is extended or adjusted under 35 U.S.C. 154(b) by 0 days.

(21) Appl. No.: 11/935,256

(22) Filed: Nov. 5, 2007

(51) Int. Cl.
*G02B 6/00* (2006.01)
*G02B 6/34* (2006.01)

(52) U.S. Cl. ............... 250/227.14; 250/227.16; 250/227.18; 385/13

(58) Field of Classification Search ............ 250/227.11, 250/227.14, 227.16, 227.18; 385/12, 13
See application file for complete search history.

(56) References Cited

U.S. PATENT DOCUMENTS

| | | | |
|---|---|---|---|
| 6,442,304 B1 * | 8/2002 | Crawley et al. | 385/12 |
| 7,137,299 B2 | 11/2006 | Meyer | |
| 7,336,862 B1 * | 2/2008 | Xai et al. | 385/12 |
| 7,366,055 B2 * | 4/2008 | Ronnekleiv et al. | 367/64 |

OTHER PUBLICATIONS

Anonymous, Seismometer, Wikipedia, the Free Encyclopedia, http://en.wikipedia.org/wiki/Seismometer (last visited Oct. 30, 2007).
Anonymous, Fiber Bragg Grating, Wikipedia, the Free Encyclopedia, http://en.wikipedia.org/wiki/Bragg_grating (last visited Oct. 29, 2007).
Kenneth O. Hill, Photosensitivity in Optical Fiber Waveguides: From Discovery to Commercialization, IEEE Journal on Selected Topics in Quantum Electronics, Nov./Dec. 2000, 1186-89, vol. 6 No. 6, IEEE.
G. Rego, et al., Simultaneous Temperature and Strain Measurement Based on Arc-Induced Long-Period Fiber Gratings.
Sung Chul Kang, et al., Temperature-Independent Strain Sensor System Using a Tilted Fiber Bragg Grating Demodulator, IEEE Photonics Technology Letters, Oct. 1998, vol. 10, No. 10, IEEE.
M. G. Xu, et al., Discrimination Between Strain and Temperature Effects Using Dual-Wavelength Fibre Grating Sensors, Electronics Letters, Jun. 23, 1994, 1085-87, vol. 30 No. 13.
M.G. Xu, et al., Temperature-Independent Strain Sensor Using a Chirped Bragg Grating in a Tapered Optical Fibre, Electronics Letters, May 11, 1995, 823-25, vol. 31 No. 10.

(Continued)

*Primary Examiner*—John R Lee
(74) *Attorney, Agent, or Firm*—Dykas, Shaver & Nipper, LLP; Elizabeth Herbst Schierman

(57) ABSTRACT

Disclosed is a sensor capable of measuring motion in a harsh environment. The sensor uses a fiber optic sensor element formed within a core of an optical fiber that is disposed within an enclosure made of a high strength, corrosion-resistant material. The optical fiber is attached to a supporting fixture in a cantilever fashion so that the intrinsic internal mass of the optical fiber has the freedom to be affected by gravity so that an environmental disturbance acting on the sensor results in a bending strain being applied to the optical fiber. A Bragg grating is located at the bending portion of the optical fiber. The modulation of an optical signal promulgating through the optical fiber is sensed using conventional means and used to measure the magnitude of the environmental disturbance.

15 Claims, 2 Drawing Sheets

OTHER PUBLICATIONS

Vikram Bhatia, et al., Simultaneous Strain and Temperature Measurement with Long-Period Gratings, Optics Letters, May 1, 1997, 648-50, vol. 22 No. 9.

M. G. Xu, et al., Chirped Fibre Gratings for Temperature-Independent Strain Sensing.

Shilie Zheng and Xianmin Zhang, Simultaneous Measurement of Pressure and Temperature Using a Single . Fiber Bragg Grating, Progress in Electromagnetics Research Symposium, Aug. 22-26 2005, 420-23, Hangzhou, China.

V. Minier, et al., Superimposed Phase Gratings in Planar Optical Waveguides for Wavelength Demultiplexing Applications, IEEE Photonics Technology Letters, Mar. 1993, 330-33, vol. 5 No. 3, IEEE.

T. Allsop, et al., Bending and Orientational Characteristics of Long Period Gratings Written in D-Shaped Optical Fiber, IEEE Transactions on Instrumentation and Measurement, Feb. 2004, 130-35, vol. 53, No. 1, IEEE.

Unknown, Unknown (Abstract beginning "A new structure of multipoint temperature-independent strain sensing system with dual fiber Bragg gratings as sensors is proposed."), Oct. 25, 1994.

K. O. Hill, et al., Photosensitivity in Optical Fiber Waveguides: Application to Reflection Filter Fabrication, Applied Physics Letters, May 15, 1978, 647-49, 32(1), American Institute of Physics.

Sung Chul Kang, et al., Temperature-Independent Strain Sensor System Using a Tilted Fiber Bragg Grating Demodulator, IEEE Photonics Technology Letters, Oct. 1998, 1461-63, vol. 10, No. 10, IEEE.

* cited by examiner

SIMPLE FIBER OPTIC SEISMOMETER FOR HARSH ENVIRONMENTS

FIELD OF THE INVENTION

The present invention relates generally to an apparatus for measuring near-acoustic vibrations, and more particularly to the measuring of seismic vibrations in severe environments, such as down-well holes or permanent sea floor installations.

BACKGROUND OF THE INVENTION

There is often a need to measure near-acoustic vibrations, such as seismic vibrations, in harsh environments. Traditional seismometers involve the suspension of a reference or proof mass within a frame and a sensor to measure the relative motion between the frame and the proof mass as seismic waves act on the frame to move it. In this manner, traditional seismometers require the use of a proof mass. Use of a proof mass limits the robustness of the seismometer, making seismometers not well suited to harsh environments.

Optical sensors are well suited to such rugged environments because they have passive detective elements that are immune from magnetic noise and electrolytic corrosion. One well-established method of sensing is remote signal processing of fiber Bragg gratings. A fiber Bragg grating includes a distributed Bragg reflector constructed in a segment of optical fiber. It allows for the reflection of particular wavelengths of light while transmitting all others. The Bragg wavelength of the fiber is sensitive to strain, whereby strain on the fiber Bragg grating causes a shift in the Bragg wavelength. Accordingly, fiber Bragg gratings can be used as direct sensing elements for environmental measurands such as strain and temperature. That is, by measuring the shift in the Bragg wavelength, a strain applied to fiber may be measured. Thus, fiber Bragg gratings may be used in sensors, wherein a mechanism that is sensitive to environmental change is constructed so that energy may be translated into the distortion of an optical grating so as to allow the resulting change in absorbed optical power to be interpreted.

SUMMARY OF THE INVENTION

Embodiments of the present simple fiber optic seismometer utilize an optical glass fiber that reacts with suitable sensitivity and accuracy in response to accelerations. In this manner, it provides desired high levels of precision seismic sensing while being manufacturable at low costs. Thus, the simple fiber optic seismometer is well suited for harsh environments.

The simple fiber optic seismometer includes a fiber optic sensor element formed within a core of an optical fiber that is disposed within an enclosure made of a high strength, corrosion-resistant material. The optical fiber, which may be cladded, is supported as a cantilever from an isolated rigid fixture so that the intrinsic internal mass of the optical fiber has the freedom to be affected by gravity such that an accelerating disturbance, such as a seismic wave, results in a bending strain being applied to the optical fiber. A Bragg grating is located at the portion of the optical fiber that is strained by the disturbance. The resulting being strain from the disturbance may be interpreted with conventional means.

In some embodiments improved axial resolution can be achieved by the use of a hollow core optical fiber with sectional geometry such as that used in telecommunication fiber optics devices, which utilizes a fiber of a relatively high bending resistance in the transverse direction relative to the working plane. In other embodiments, improved axial resolution can be achieved by exploiting the modified fiber strength that results from etching a Bragg grating onto the cladding of the fiber or by the use of slant gratings. In still other embodiments, a tilted fiber Bragg grating (TFBG) may be utilized.

The purpose of the foregoing Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
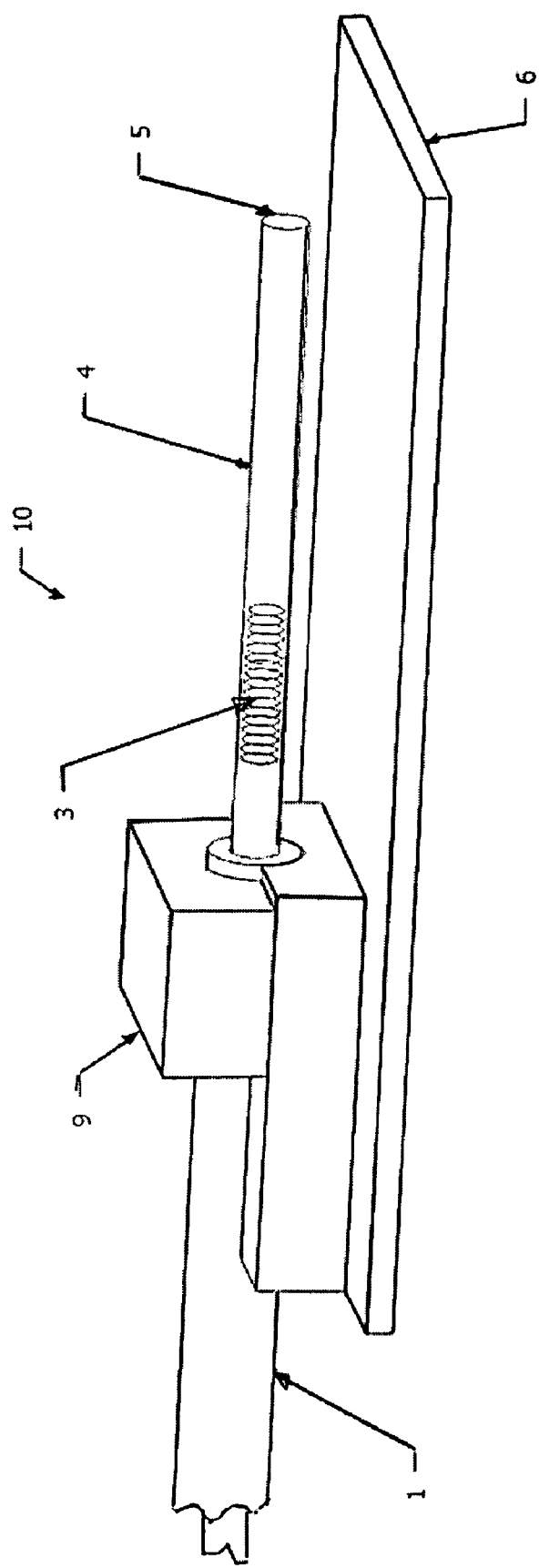
FIG. 1 is an isometric, partial, perspective view of the core assembly of a simple fiber optic seismometer according to an embodiment of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in the figures for purposes of illustration, the device is embodied in a simple fiber optic seismometer that provides desired high levels of precision seismic sensing while being suitable for use in harsh environments and manufacturable at low cost. The embodiments of the simple fiber optic seismometer eliminate the need for a separate proof or reference mass attachment and eliminate the need for reflective or other specific optical termination of the fiber optic end.

In the following description and in the figures, like elements are identified with like reference numerals. The use of "or" indicates a non-exclusive alternative without limitation unless otherwise noted. The use of "including" means "including, but not limited to," unless otherwise noted.

Figure 2:
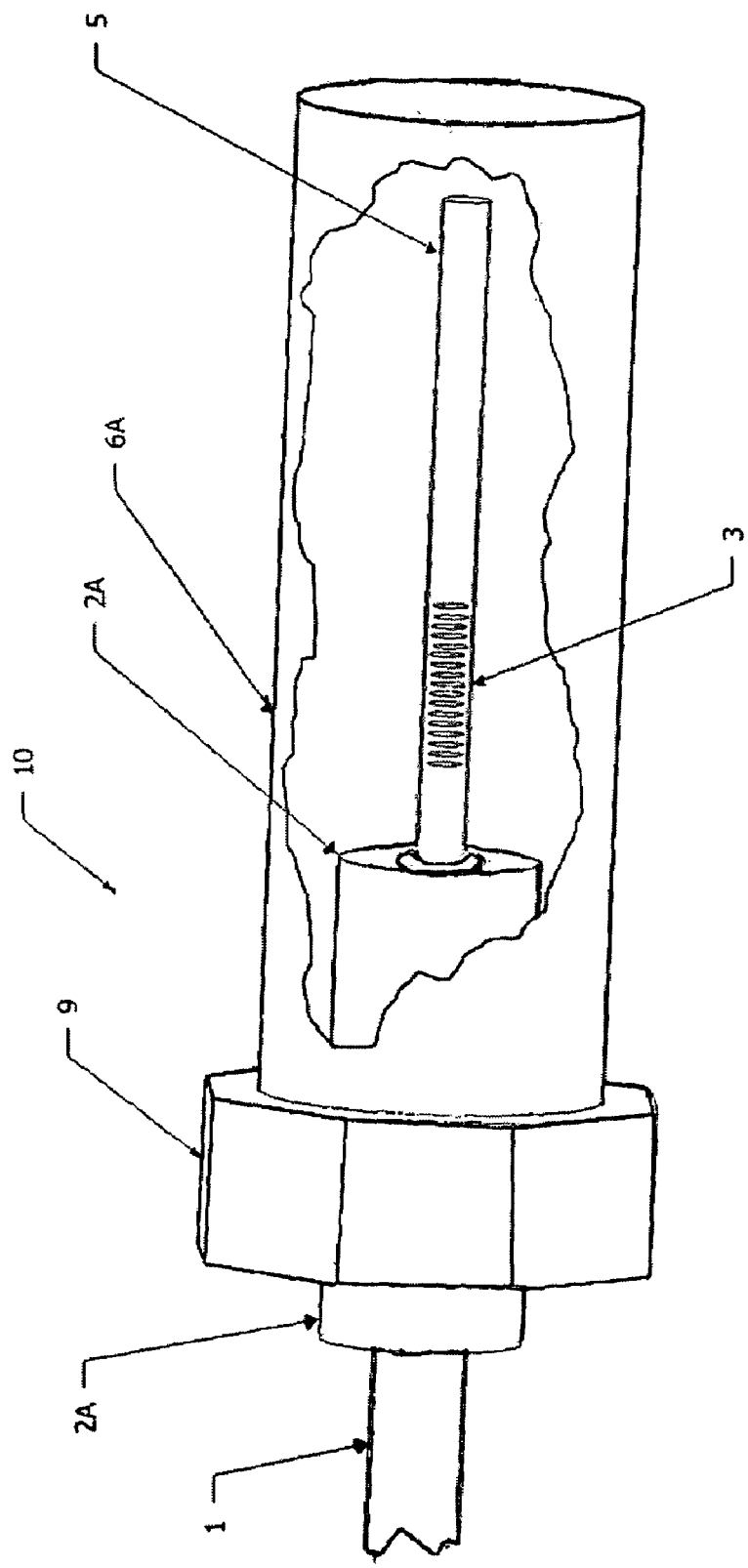
FIG. 2 is an isometric, partial, perspective view of the core assembly of a simple fiber optic seismometer as encased within a hermetic tube according to another embodiment of the invention.

An embodiment of a simple fiber optic seismometer is shown in FIG. 1. Another embodiment, having many similar components, is shown in FIG. 2. For convenience, components shown in FIG. 2 that are similar to the corresponding components in FIG. 1 are assigned the same reference numerals. Analogous, though different, components are assigned the same reference number accompanied by an "A."

As shown in FIG. 1, the simple fiber optic seismometer includes a main body 6 capable of responding to a disturbance such as an acceleration having a force component in one or more axes. Attached to the main body 6 is a supporting fixture 9 through which a fiber optical feed cable 1 passes. Within the fiber optical feed cable 1 is a optical fiber 5, through which light of a predetermined frequency propagates. The optical fiber 5 extends from its proximal end to it distal end away from the supporting fixture 9. The proximal end of the optical fiber 5 is fixedly coupled to a supporting fixture 9, which is fixedly coupled to the main body 6.

A Bragg grating sensing element 3 is arranged within the optical fiber 5. The Bragg grating sensing element 3 is configured to respond to an optical signal and to respond to a strain applied to the optical fiber as a result of an environmental disturbance, such as a seismic wave. In one embodiment, the Bragg grating of the Bragg grating sensing element is applied onto the optical fiber by use of glue or epoxy. In another embodiment, the Bragg grating may be etched upon the cladding of the optical fiber. In still another embodiment, the Bragg grating may be inscribed upon an optical fiber that has been pre-strained before inscription.

The Bragg grating sensing element 3 is more specifically configured so that a reference location (pictorially represented as the theoretical center of gravity 4 of the optical fiber 5) on the optical fiber 5 is isolated from mechanically-induced strain such that when an environmental disturbance acts upon the device, the inertia of the optical fiber 5 imposes a strain upon the optical fiber 5 the optical fiber 5 will be distorted thereby causing the intensity of light propagating through the optical fiber 5 to modulate in proportion to the magnitude of the environmental disturbance. The resulting modulation of the light may be monitored by conventional means wherein the light signals are photo detected and the phase or frequency of the light signal sensed.

In some embodiments, the optical fiber 5, in association with the supporting fixture 9, is further configured so that the resulting bending strain upon the optical fiber 5, due to the environmental disturbance, will be concentrated in a region of the optical fiber 5 close to the supporting fixture 9.

In other embodiments the optical fiber 5 may be replaced by a plurality of optical fibers, each supported on its proximal end by a center ferrule 2A, which is fixedly attached to the supporting fixture 9, while having a distal end with the freedom to motion to react to a bending strain due to an environmental disturbance acting on the device. More specifically, the distal end of each fiber is allowed to move sympathetic to a difference of forces created from the intrinsic inertial moment of the mode fiber and the gravitational force acting on the moving main body 6 when the device 10 is acted on by an environmental disturbance.

In some embodiments, a hermetic enclosure 6A houses the optical fiber 5. In these embodiments, the ferrule 2A by which the optical fiber 5 is supported is configured be attached to the hermetic enclosure 6A, forming a seal between the hermetic enclosure 6A and the ferrule 2A. In some configurations of these embodiments, the sealed hermetic enclosure 6A seals a fluid charge within the hermetic enclosure so as to overcome environmental pressure and so as to exclude environmental matter.

In all embodiments, the optical fiber 5 is tuned to target a fiber bending strain sufficient for a measurable change in grating geometry for the targeted environmental disturbance. This tuning is achieved by simply selecting an optical fiber 5 of desired specific weight, diameter, and bending strength and trimming the distal end of the fiber 5.

The exemplary embodiments shown in the figures and described above illustrate but do not limit the invention. It should be understood that there is no intention to limit the invention to the specific form disclosed; rather, the invention is to cover all modifications, alternative constructions, and equivalents falling within the spirit and scope of the invention as defined in the claims.

For example, while the exemplary embodiments illustrate a seismometer, the invention is not limited to use with seismological vibrations and may be used with other vibration sources. While the invention is not limited to use with seismology, it is expected that various embodiments of the invention will be particularly useful in such devices. Thus, while there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A motion sensor for sensing motion in an environment, comprising:
   a main body having contact with a reference location where an environmental disturbance force having a disturbance magnitude may act upon said main body so as to cause said main body to react;
   a supporting fixture attached to said main body;
   a fiber optical feed cable passing axially through said supporting fixture, said fiber optical feed cable comprising:
   at least one optical fiber passing axially through said fiber optic feed cable, each of said at least one optical fiber having an intrinsic internal proof mass and being configured to allow light to propagate through said at least one optical fiber, each of said at least one optical fiber extending from a proximal end to a distal end away from said supporting fixture, said proximal end being attached to said supporting fixture, said distal end being not directly attached to other fiber or support and so being free to respond to a strain applied to said at least one optical fiber, said strain resulting from said environmental disturbance force acting on said intrinsic internal proof mass alone, each of said at least one optical fiber comprising at least one Bragg grating sensing element arranged within each of said at least one optical fiber and between said proximal end and said distal end, each of said at least one Bragg grating sensing elements being configured to respond to an optical signal and to respond to said strain;
   whereby when said environmental force acts upon said main body, said strain is applied to said at least one optical fiber and each of said at least one optical fiber bends under said strain thereby modulating said light so as to create an optical sensing signal related to said disturbance magnitude.

2. The motion sensor for sensing motion in an environment of claim 1, wherein each of said at least one optical fiber has a center of gravity, a fiber length, a fiber strength, a sectional shape, and a fiber formulation, each configured to accommodate sensing of said disturbance magnitude of said environmental disturbance.

3. The motion sensor for sensing motion in an environment of claim 1, further comprising:
   a ferrule, whereby said proximal end is attached to said supporting fixture via said ferrule; and a hermetic enclosure configured to enclose said at least one optical fiber, said ferrule being configured for attachment to said hermetic enclosure;

wherein attachment of said ferrule to said hermetic enclosure creates a seal between said ferrule and said hermetic enclosure.

4. The motion sensor for sensing motion in an environment of claim 3, said hermetic enclosure is configured to also enclose a fluid, said seal being configured to discourage leakage of said fluid from said hermetic enclosure and to discourage entrance of environmental matter.

5. The motion sensor for sensing motion in an environment of claim 1, wherein each of said at least one Bragg grating sensing elements comprises a Bragg grating, said Bragg grating being fixedly attached onto one of said at least one optical fiber with either glue or epoxy.

6. The motion sensor for sensing motion in an environment of claim 1, wherein each of said at least one Bragg grating sensing elements comprises a tilted fiber Bragg grating.

7. The motion sensor for sensing motion in an environment of claim 1, wherein each of said at least one Bragg grating sensing elements comprises a Bragg grating, said Bragg grating being inscribed upon one of said at least one optical fiber where each of said at least one optical fiber has been pre-strained prior to inscription of said Bragg grating.

8. A motion sensor for sensing motion in an environment, comprising:
a main body having contact with a reference location where an environmental disturbance force having a disturbance magnitude may act upon said main body so as to cause said main body to react;
a supporting fixture attached to said main body;
a fiber optical feed cable passing axially through said supporting fixture, said fiber optical feed cable comprising:
an optical fiber having a cladding, said optical fiber passing axially through said fiber optic feed cable, said optical fiber having an intrinsic internal proof mass and being configured to allow light to propagate through said optical fiber, said optical fiber extending from a proximal end to a distal end away from said supporting fixture, said proximal end being attached to said supporting fixture, said distal end being not directly attached to other fiber or support and so being free to respond to a strain applied to said optical fiber, said strain resulting from said environmental disturbance force acting on said intrinsic internal proof mass and said cladding alone, said optical fiber comprising at least one Bragg grating sensing element arranged within said optical fiber and between said proximal end and said distal end,
each of said at least one Bragg grating sensing elements being configured to respond to an optical signal and to respond to said strain;
whereby when said environmental force acts upon said main body, said strain is applied to said optical fiber and said cladding and said optical fiber and said cladding bend under said strain thereby modulating said light so as to create an optical sensing signal related to said disturbance magnitude.

9. The motion sensor for sensing motion in an environment of claim 8, wherein said optical fiber has a center of gravity, a fiber length, a fiber strength, a sectional shape, and a fiber formulation, each configured to accommodate sensing of said disturbance magnitude of said environmental disturbance.

10. The motion sensor for sensing motion in an environment of claim 8, further comprising:
a ferrule, whereby said proximal end is attached to said supporting fixture via said ferrule; and
a hermetic enclosure configured to enclose said optical fiber, said ferrule being configured for attachment to said hermetic enclosure;
wherein attachment of said ferrule to said hermetic enclosure creates a seal between said ferrule and said hermetic enclosure.

11. The motion sensor for sensing motion in an environment of claim 10, said hermetic enclosure is configured to also enclose a fluid, said seal being configured to discourage leakage of said fluid from said hermetic enclosure and to discourage entrance of environmental matter.

12. The motion sensor for sensing motion in an environment of claim 8, wherein each of said at least one Bragg grating sensing elements comprises a Bragg grating, said Bragg grating being fixedly attached onto said optical fiber with either glue or epoxy.

13. The motion sensor for sensing motion in an environment of claim 8, wherein each of said at least one Bragg grating sensing elements comprises a Bragg grating, said Bragg grating being etched upon said cladding.

14. The motion sensor for sensing motion in an environment of claim 8, wherein each of said at least one Bragg grating sensing elements comprises a tilted fiber Bragg grating.

15. The motion sensor for sensing motion in an environment of claim 8, wherein each of said at least one Bragg grating sensing elements comprises a Bragg grating, said Bragg grating being inscribed upon said optical fiber where said optical fiber has been pre-strained prior to inscription of said Bragg grating.

* * * * *